US012700956B2

(12) United States Patent
Van Phan et al.

(10) Patent No.: US 12,700,956 B2
(45) Date of Patent: Aug. 4, 2026

(54) RELAY DISCOVERY WITHIN A SIDELINK GROUPCAST

(71) Applicant: Nokia Technologies Oy, Espoo (FI)

(72) Inventors: Vinh Van Phan, Oulu (FI); Ling Yu, Espoo (FI); Lianghai Ji, Aalborg (DK); Rudraksh Shrivastava, Stuttgart (DE); Sudeep Hegde, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 485 days.

(21) Appl. No.: 18/260,995

(22) PCT Filed: Jan. 13, 2021

(86) PCT No.: PCT/EP2021/050519

§ 371 (c)(1),
(2) Date: Jul. 11, 2023

(87) PCT Pub. No.: WO2022/152369

PCT Pub. Date: Jul. 21, 2022

(65) Prior Publication Data

US 2024/0097834 A1 Mar. 21, 2024

(51) Int. Cl.
H04L 1/1829 (2023.01)
H04L 1/1867 (2023.01)
H04W 72/25 (2023.01)

(52) U.S. Cl.
CPC .......... H04L 1/1864 (2013.01); H04L 1/1896 (2013.01); H04W 72/25 (2023.01)

(58) Field of Classification Search
CPC ......... H04W 56/0055; H04W 56/0045; H04W 48/08; H04W 84/06; H04W 28/04; H04W 76/20; H04W 72/21; H04W 92/18; H04L 1/08; H04L 1/1812
See application file for complete search history.

(56) References Cited

U.S. PATENT DOCUMENTS

2008/0045141 A1 * 2/2008 Suga ................... H04W 84/047
455/7

* cited by examiner

*Primary Examiner* — Iqbal Zaidi
(74) *Attorney, Agent, or Firm* — Barta Jones, PLLC

(57) ABSTRACT

It is provided a method comprising: indicating that a HARQ process is initiated for transmitting at least a first HARQ message comprising an inquiry as the first message of the HARQ process, wherein the inquiry inquires whether a relay terminal for relaying a communication of a transmitting terminal is available; transmitting the first HARQ message using the HARQ process; monitoring whether a HARQ feedback is received from at least one relay terminal in response to the first HARQ message according to the HARQ process; deciding that the at least one relay terminal is available if the HARQ feedback is received from the at least one relay terminal; deciding that the at least one relay terminal is not available if the HARQ feedback is not received from the at least one relay terminal.

20 Claims, 5 Drawing Sheets

Fig. 2 (CONTD)
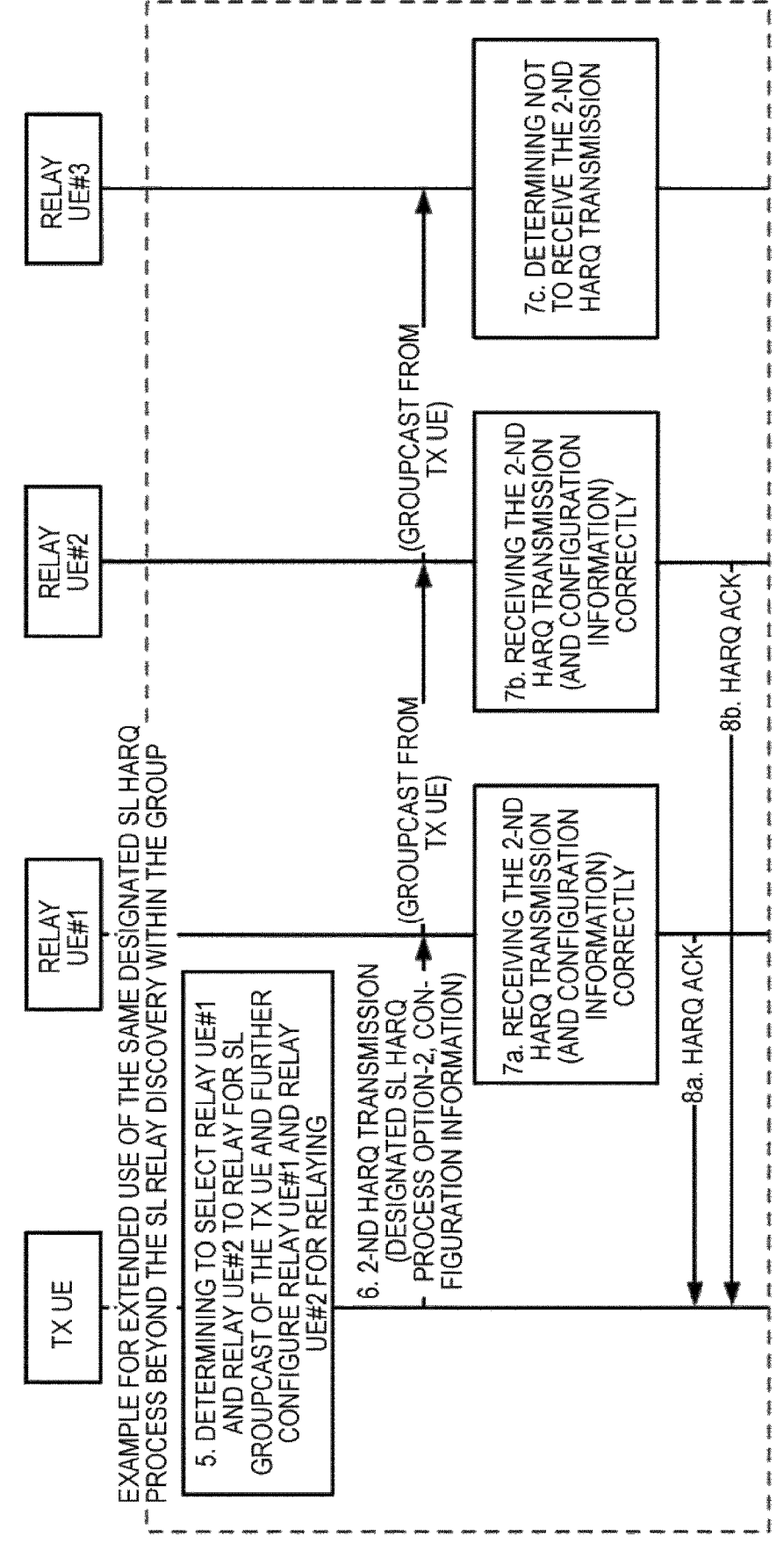

S100 Indicate initiation of HARQ process with 1st HARQ message comprising inquiry S110 Transmit 1st HARQ message comprising inquiry S120 HARQ feedback received?

yes no

S130 Relay UE available

S140 Relay UE not available

100

110

120

130

Figures 5, 6, 7:
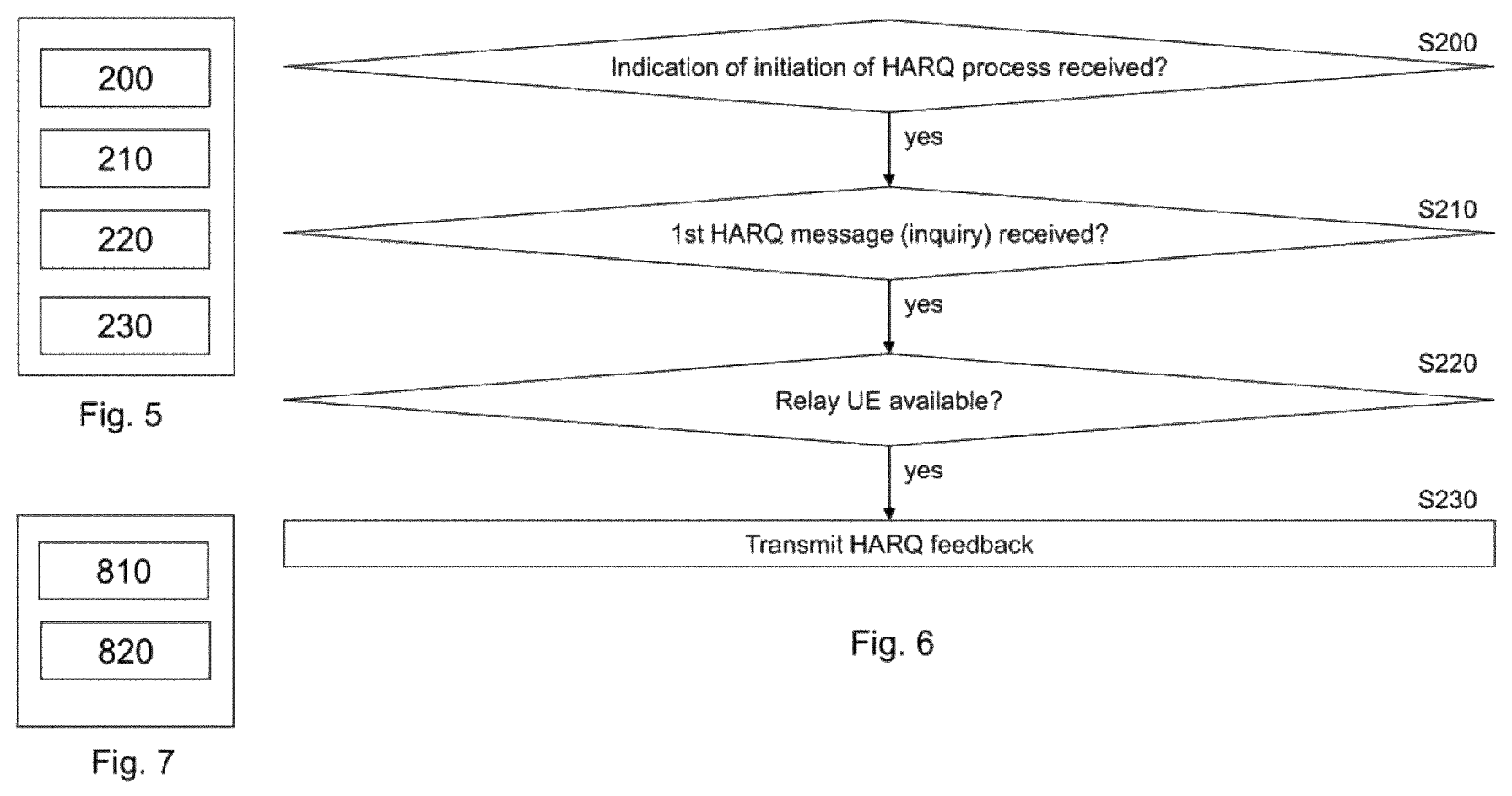

S200

Indication of initiation of HARQ process received?

yes

S210

1st HARQ message (inquiry) received?

yes

S220

Relay UE available?

yes

S230

Transmit HARQ feedback

RELAY DISCOVERY WITHIN A SIDELINK GROUPCAST

RELATED APPLICATION

This application claims priority to PCT Application No. PCT/EP2021/050519, filed on Jan. 13, 2021, which is incorporated herein by reference in its entirety.

FIELD OF THE INVENTION

The present disclosure relates to sidelink communication.

Abbreviations

3GPP 3$^{rd}$ Generation Partnership Project
4G/5G/6G 4$^{th}$/5$^{th}$/6$^{th}$ Generation
ACK Acknowledgment
AGC Automatic Gain Control
CBR Channel Busy Ratio
DMRS Demodulation Reference Signal
DST Destination
DTX Discontinuous Transmission
FEC Forward Error Correction
HARQ Hybrid Automatic Repeat Request
ID Identifier
L1 Layer 1 (Physical Layer)
L2 Layer 2 (Data Link Layer)
MAC Medium Access Control
NACK Negative Acknowledgment
NR New Radio
OFDM Orthogonal Frequency Division Multiplex
PRB Physical Resource Block
PSFCH Physical Sidelink Feedback Channel
PSCCH Physical Sidelink Control Channel
PSSCH Physical Sidelink Shared Channel
QoS Quality of Service
Rel Release
R-UE Relay UE
Rx Receive
SCI Sidelink Control Information
SL Sidelink
TB Transport Block
Tx Transmit

BACKGROUND OF THE INVENTION

SL communications between UEs over PC5, as described in e.g. 3GPP TS 36.300 for LTE and 3GPP TS 38.300 for NR, are based on the principle of transmitter (Tx UE) oriented one-to-many broadcast.

Tx UE transmits SL to a Rx UE or a group of Rx UEs or all Rx UEs in proximity of Tx UE using resources from a (pre-)configured resource pool. Tx UE transmits at least SL control information (SCI) which is used as a scheduling assignment for a SL data transmission. On the other hand, Rx UE keeps monitoring over the (pre-)configured resource pool to receive SL. At least, Rx UE receives all SCI instances and determines whether a received SCI and corresponding SL data transmission is meant for Rx UE to receive or not, based on Source (SRC) and/or destination (DST) ID(s) indicated in the received SCI instances. SRC corresponds to Tx side, and DST corresponds to Rx side. This is applicable for all casting types over SL: unicast, groupcast, and broadcast.

There are two modes of resource allocation, referred to as Mode 1 and Mode 2, specified for a SL transmission. Mode 1 is based on using scheduled resources or grants from a serving BS. This implies that Tx UE are in RRC CONNECTED state of the serving BS in order to get Mode 1 resources allocated. Mode 2 is based on autonomous allocation or selection of resources from a preconfigured Tx resource pool by Tx UE. The resource selection in Mode 2 can be based on a simple random selection or sensing-based selection. The latter is typically preferred and used for normal operation, while the former is typically used for exceptional operations or situations with a particular, preconfigured resource pool. Mode 2 can be used for Tx UE being in coverage or out-of-coverage and regardless of whether the Tx UE is in RRC IDLE, RRC INACTIVE or RRC CONNECTED state.

3GPP TS 38.212 specifies SCI which is used for scheduling a SL HARQ transmission, SCI is carried on PSCCH and transports sidelink scheduling information.

In particular for 3GPP Rel. 17 and beyond, 3GPP discusses both SL based UE-to-Network relays and UE-to-UE relays (see e.g. study item RP-193253). For example, a transmitting UE member may use a SL-based UE-to-UE relay to extend its service coverage, i.e., the range of data transmission over SL for a groupcast. As another example, a remote UE member which is suffering from network coverage problem may use a SL-based UE-to-Network relay to get access to the serving network. SL-based relays may also be used, for example, for reducing transmitter power, enhancing reliability, and/or maintaining certain level of QoS for the transmitting or remote UE.

In order to use a UE-to-UE relay or a UE-to network relay, the transmitting UE or remote UE (sometimes jointly denoted as Tx UE) should first identify the presence of at least one suitable relay UE to request relay service in its proximity. To enable identification, the relay UE may announce its presence by transmitting SL discovery messages periodically, and/or the transmitting UE or remote UE may announce SL discovery solicitation messages, expecting the relay UE to respond by a discovery response message. The discovery response message is sent via a resource selected by the relay UE or scheduled by network, which may cause additional scheduling delay.

Once the transmitting UE or remote UE detects the relay UE candidate(s), it selects one or more relay UEs. During relay discovery, the transmitting UE or remote UE may obtain the UE ID of the relay UE to be used for SL transmission and reception of the relayed traffic. As another option, there may be a blind relay in which the Tx UE does not need to identify individual relay UEs but just presence of at least one relay UE.

A SL groupcast denotes a SL communication within a defined group of UEs. The group is designated by a group ID which is a part of the UE ID. The group ID is included in the destination field, for example.

A HARQ transmission encodes a payload to enable forward error correction by the receiver. If FEC fails, the receiver may send HARQ NACK to the transmitter, requesting retransmission of the payload, otherwise, the receiver may send HARQ ACK (HARQ feedback). Rel'16 NR SL specifies two options of SL HARQ feedback for SL groupcast, referred to as option-1 and option-2.

SL HARQ option-1 (depicted in FIG. 1$a$): one common Physical Sidelink Feedback Channel (PSFCH) resource is used for group members, Rx UEs, to send NACK feedback to a Tx UE if a HARQ transmission from the Tx UE is not received correctly. In this option, the Tx UE may set a range so that only group members within the range need to receive HARQ transmission from the Tx UE.

SL HARQ option-2 (depicted in FIG. 1b): a respective dedicated PSFCH resource is used for each group member, Rx UE, to send either ACK or NACK to a Tx UE if a HARQ transmission from the Tx UE is received correctly or not. In case the HARQ transmission is not detected at the Rx UE (e.g., SCI sent by the Tx UE to schedule the HARQ transmission is not received), the Tx UE may detect a DTX feedback on the PSFCH of the Rx UE.

In Rel'16 feedback-enabled SL HARQ, the PSFCH resource for sending SL HARQ feedback is derived from the resource location of PSCCH/PSSCH. For example, the time resources for PSFCH may occur every 2 slots for all frequency resources of the resource pool for sidelink communication.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: indicate that a hybrid automatic repeat request process is initiated for transmitting at least a first hybrid automatic repeat request message comprising an inquiry as the first message of the hybrid automatic repeat request process, wherein the inquiry inquires whether a relay terminal for relaying a communication of a transmitting terminal is available; transmit the first hybrid automatic repeat request message using the hybrid automatic repeat request process; monitor whether a hybrid automatic repeat request feedback is received from at least one relay terminal in response to the first hybrid automatic repeat request message according to the hybrid automatic repeat request process; decide that the at least one relay terminal is available if the hybrid automatic repeat request feedback is received from the at least one relay terminal; decide that the at least one relay terminal is not available if the hybrid automatic repeat request feedback is not received from the at least one relay terminal.

According to a second aspect of the invention, there is provided an apparatus comprising: one or more processors, and memory storing instructions that, when executed by the one or more processors, cause the apparatus to: monitor whether an indication of an initiation of a hybrid automatic repeat request process is received from a transmitting terminal, wherein a first message of the hybrid automatic repeat request process comprises an inquiry, and the inquiry inquires if a relay terminal for relaying a communication is available; monitor, if the indication is received, whether the first hybrid automatic repeat request message of the hybrid automatic repeat request process is received; evaluate, if the first hybrid automatic repeat request message is received, based on the inquiry, whether a relay terminal is available for relaying the communication for the transmitting terminal; transmit a hybrid automatic repeat request feedback in response to the received first hybrid automatic repeat request message according to the hybrid automatic repeat request process if the relay terminal is available for relaying the communication for the transmitting terminal.

According to a third aspect of the invention, there is provided a method comprising: indicating that a hybrid automatic repeat request process is initiated for transmitting at least a first hybrid automatic repeat request message comprising an inquiry as the first message of the hybrid automatic repeat request process, wherein the inquiry inquires whether a relay terminal for relaying a communication of a transmitting terminal is available; transmitting the first hybrid automatic repeat request message using the hybrid automatic repeat request process; monitoring whether a hybrid automatic repeat request feedback is received from at least one relay terminal in response to the first hybrid automatic repeat request message according to the hybrid automatic repeat request process; deciding that the at least one relay terminal is available if the hybrid automatic repeat request feedback is received from the at least one relay terminal; deciding that the at least one relay terminal is not available if the hybrid automatic repeat request feedback is not received from the at least one relay terminal.

According to a fourth aspect of the invention, there is provided a method comprising: monitoring whether an indication of an initiation of a hybrid automatic repeat request process is received from a transmitting terminal, wherein a first message of the hybrid automatic repeat request process comprises an inquiry, and the inquiry inquires if a relay terminal for relaying a communication is available; monitoring, if the indication is received, whether the first hybrid automatic repeat request message of the hybrid automatic repeat request process is received; evaluating, if the first hybrid automatic repeat request message is received, based on the inquiry, whether a relay terminal is available for relaying the communication for the transmitting terminal; transmitting a hybrid automatic repeat request feedback in response to the received first hybrid automatic repeat request message according to the hybrid automatic repeat request process if the relay terminal is available for relaying the communication for the transmitting terminal.

Each of the methods of the third and fourth aspects may be a method of relay discovery.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

fast and efficient relay discovery within group members of
    a given SL groupcast;
  optimize latency for the SL relay discovery within the SL
    groupcast;
  minimize impacts on standardization.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 5 shows an apparatus according to an example embodiment of the invention;

FIG. 6 shows a method according to an example embodiment of the invention; and FIG. 7 shows an apparatus according to an example embodiment of the invention.

DETAILED DESCRIPTION OF CERTAIN EMBODIMENTS

Figures 1A, 1B:
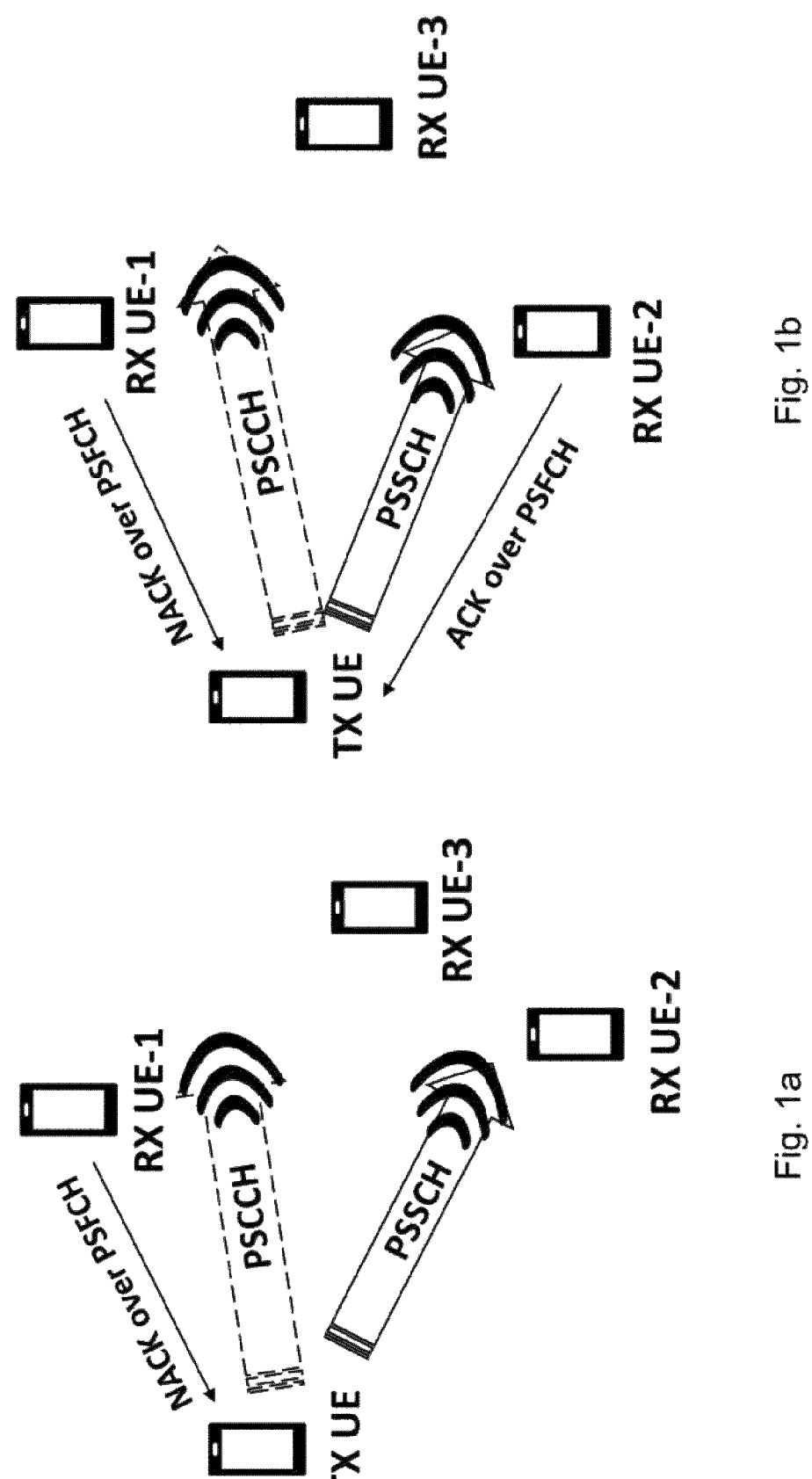
FIG. 1a shows HARQ option-1 according to the prior art.
FIG. 1b shows HARQ option-2 according to the prior art.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention are related to SL based relays within, for example, a given SL groupcast.

It is preferable for the transmitting UE member or the remote UE member to prioritize and select relay UE(s) from capable and available group members for the UE-to-UE relay or UE-to-Network relay mentioned above. This is due to the following reasons: (i) it is more reassuring in terms of security, acceptability and efficiency, as additional authentication and authorization between the transmitting UE or the remote UE and the relay UE may be avoided and, in case of the SL groupcast, the relay UE member needs to receive data from the transmitting UE member anyways; and (ii) in some use cases, such as mission-critical group communications for public safety or military applications in hostile environments, there may be no other options but to rely on members within the group.

The current SL relay discovery procedures, as specified since 3GPP Rel'14, have been designed for generic purpose without considerations of ensuring service continuity and QoS. Thus, latency and efficiency of the current SL relay discovery procedures are not predictable or controllable by the transmitting UE or the remote UE which may cause an impact on the support for service continuity and QoS addressed in the current Rel'17 study RP-193253. Some example embodiments of the invention address this shortcoming.

Some example embodiments of this invention provide a method to enable and facilitate fast and efficient SL relay discovery within group members of a given SL groupcast. The method is based on a use of Rel'16 SL groupcast HARQ options to optimize latency and efficiency for the SL relay discovery within the SL groupcast. The method may, at the same time, minimize impacts on standardization.

In particular, a designated SL groupcast HARQ process is used by a transmitting UE member or a remote UE member (jointly sometimes referred to as Tx UE), for sending a relay discovery solicitation message for either UE-to-UE relay discovery or UE-to-Network relay discovery within the group members. The designated SL groupcast HARQ process may be based on either SL HARQ option-2 or SL HARQ option-1. In order to distinguish the designated SL groupcast HARQ process from other HARQ processes, the designated SL groupcast HARQ process may be identified by the Tx UE and all relay UE members by, for example:

(i) an explicit indication via
 a. an exclusive L2 DST ID or SL groupcast HARQ process ID configured to all relay UE members of the groupcast for sending and receiving the designated SL groupcast HARQ process; or
 b. a new indication in SCI when scheduling for the designated SL groupcast HARQ process; or
(ii) an implicit indication via the use of resources from an exclusive resource pool.

The indication may be sent in SCI which is used for initiating a SL HARQ process and scheduling for a SL HARQ transmission.

In case Tx UE needs to identify individual relay UE members in proximity, SL HARQ option-2 may be used. This is because SL HARQ option-2 is relied on HARQ feedback (ACK or NACK) sent/received on dedicated PSFCHs from individual UE members. In case Tx UE does not need to identify individual relay UE members in proximity, SL HARQ option-1 may be used. This is because SL HARQ option-1 is relied on HARQ feedback (NACK) sent/received on a common PSFCH from UE members. As still another option, the network may be configured for only one of these options.

The designated SL groupcast HARQ process is initiated by the Tx UE for sending a relay discovery solicitation message within the group. The solicitation message may comprise, for examples, an indication of the targeted SL relay discovery, e.g., UE-to-UE relay or UE-to-Network relay; and/or criteria for a relay UE candidate to send a response to the solicitation message in form of SL HARQ feedback on PSFCH to the Tx UE.

In case SL HARQ option-1 is used (e.g., the Tx UE does not need to identify individual relay UEs), the criteria indicated in the solicitation message are used for a relay UE member, upon reception of the solicitation message, to determine whether or not it is able to meet the criteria to be a relay UE candidate. If the determination is positive then it sends a response in form of HARQ option-1 NACK to the Tx UE on the common PSFCH.

In case SL HARQ option-2 is used (e.g., the Tx UE needs to identify individual relay UEs), the criteria may further comprise, for example, an exceptional subset of the criteria, in addition to the criteria according to SL HARQ option-1 (base criteria). A candidate relay UE member fulfilling the base criteria may determine whether to send a response in form of HARQ option-2 ACK or NACK to the Tx UE on the dedicated PSFCH to be a relay UE candidate without or with exception, respectively. The latter (i.e. UE candidate with exception) is for the case the relay UE member is not able to meet some of the exceptional criteria but all other criteria. In case no exceptional subset of the criteria is configured or provided by the Tx UE in the solicitation message, depending on implementation or configuration, relay UE may reply with NACK-feedback only, or with ACK-feedback only, or may select one of ACK-feedback and NACK-feedback based on other conditions. Further options and details are elaborated below. While the present application assumes that ACK is sent if the candidate relay UE member fulfills the exceptional criteria and NACK is sent if the candidate relay UE member does not fulfill the exceptional criteria, in some example embodiments NACK is sent if the candidate relay UE member fulfills the exceptional criteria and ACK is sent if the candidate relay UE member does not fulfill the exceptional criteria.

The solicitation message may be sent in a regular L1 TB or in SCI.

The former means the solicitation message is of a higher layer (a layer above L1). This option is enabled by the current PSFCH resource mapping. That is, there is sufficient time for the relay UE member to receive the TB and read the solicitation message until a response in form of the HARQ feedback needs to be sent on the corresponding PSFCH to the Tx UE.

The latter means that the solicitation message is of L1 and there may be no actual HARQ TB to be sent using the designated SL groupcast HARQ process.

The designated SL groupcast HARQ process may comprise one or more HARQ transmissions of the solicitation message. In case tight latency is required for the SL relay discovery, a single HARQ transmission may be used. However, the use of more than one HARQ transmissions within the required latency constraint may improve flexibility and robustness.

In some example embodiments, the SL relay discovery within the given SL group using the designated SL HARQ process may be initiated and controlled by the access stratum to enable a dynamic use of the SL relay for enhancing service coverage and/or reducing transmit power for the Tx UE.

In some example embodiments, in case the designated SL HARQ process is based on the SL HARQ option-2, the use of both ACK and NACK may be optional.

In some example embodiments, the designated SL HARQ process may be used for conveying configuration information related to SL data transmission of the Tx UE and relaying of SL data at relay UE candidates from the Tx UE to relay UE candidates. This is beneficial in terms of reducing latency and overhead in case all or more than one relay UE candidates may be selected for relaying SL groupcast transmission of the Tx UE. This option may be available irrespective of whether there is a need of identifying the selected relay UE candidates.

Figure 2:
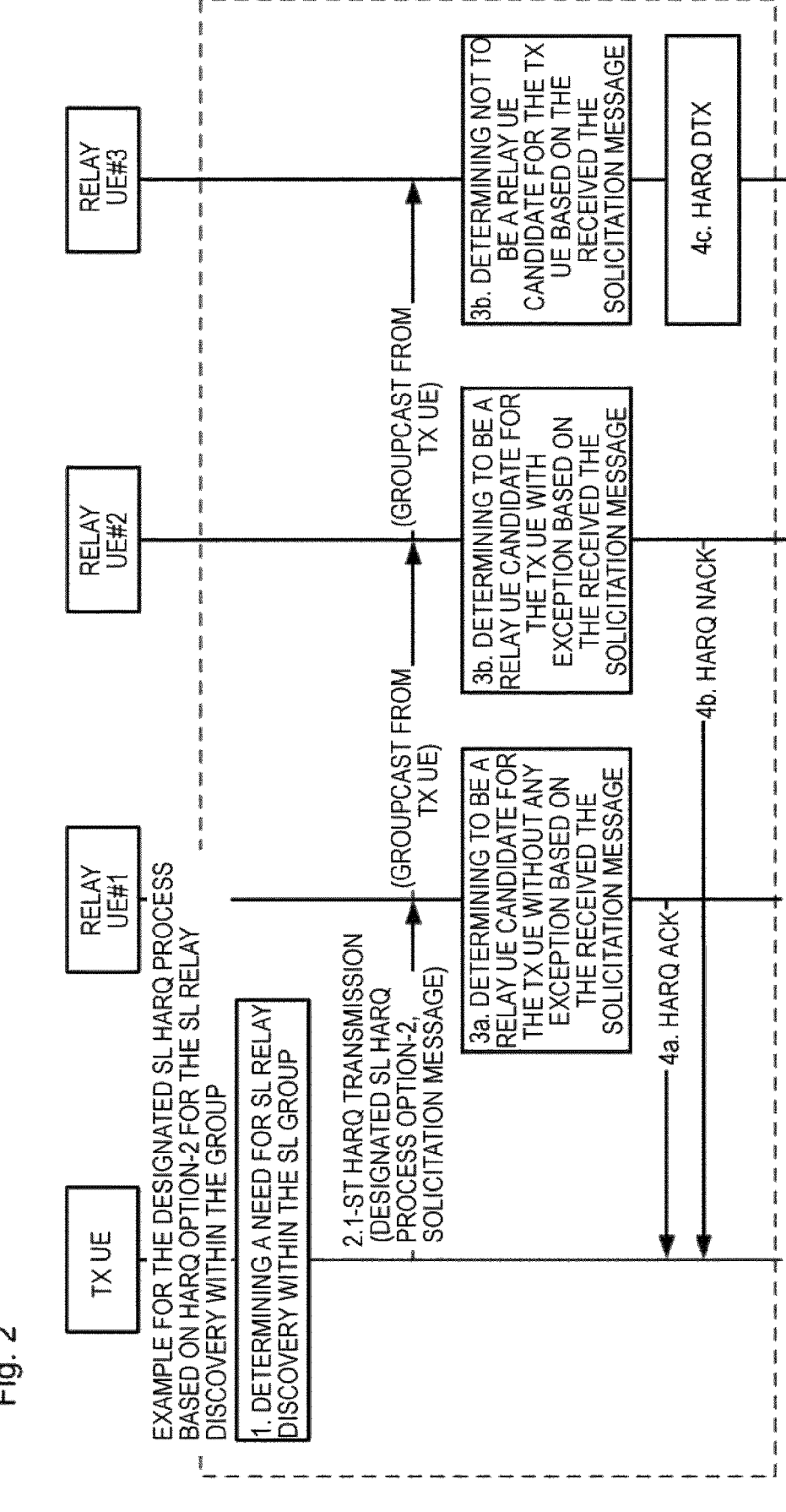
FIG. 2 shows a message flow according to some example embodiments of the invention.
Figures 3, 4:
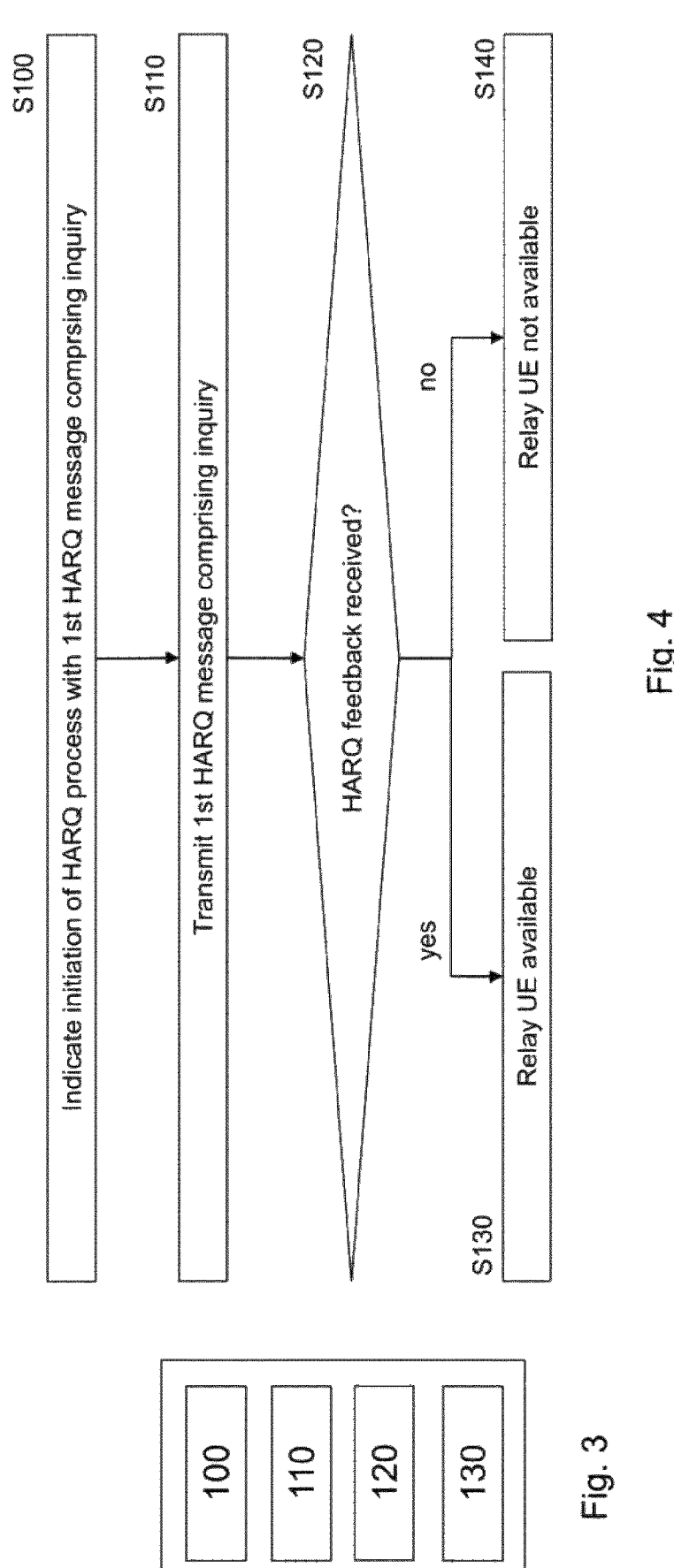
FIG. 3 shows an apparatus according to an example embodiment of the invention.
FIG. 4 shows a method according to an example embodiment of the invention.

In one embodiment, individual HARQ transmissions of the designated SL HARQ process may be used for conveying different messages, i.e., different TBs, either independently or dependently on each other. For example, a message sent in the second HARQ transmission may be different from the solicitation message sent in the first HARQ transmission and aimed for those relay UE candidates which have already received the solicitation message sent in the first HARQ transmission correctly and sent the response in form of HARQ feedback to the Tx UE, as shown in FIG. 3. Thus, relay UE members and/or relay UE candidates may receive and acknowledge individual HARQ transmissions of the designated SL HARQ process accordingly. For examples, as shown in the example message flow of FIG. 2, relay UE members (Relay UE #1, Relay UE #2, Relay UE #3) receive and acknowledge the first HARQ transmission carrying the solicitation message. The example of FIG. 3 considers that the designated HARQ process is based on SL HARQ option-2. Based on a base criterion provided with the solicitation message, relay UE #1 and Relay UE #2 determine to be a candidate relay UE for the groupcast transmission, while Relay UE #3 determines that it is not a candidate relay UE. Thus, Relay UE #3 does not reply to the solicitation message and Tx UE determines HARQ DTX for Relay UE #3. In addition, Relay UE #1 and Relay UE #2 determine whether or not they fulfil the exceptional criteria provided with the solicitation message. Relay UE #1 determines that it fulfils the exceptional criteria, while Relay UE #2 determines that it does not fulfil the exceptional criteria. Accordingly, they reply to the solicitation message with ACK and NACK on dedicated PSFCHs, respectively. Then, only relay UE candidates which have replied to the solicitation message (i.e. Relay UE #1 and Relay UE #2) may receive the second HARQ transmission and acknowledge the second HARQ transmission according to the normal operation of the SL HARQ, either option-1 or option-2, as shown in the bottom part of the example message flow of FIG. 2.

In one option, the same L2 DST ID may be used throughout the designated SL HARQ process which is utilized for sending different messages in different HARQ transmissions, starting from the solicitation message in at least the first HARQ transmission. In this option, in order to allow that only relay UE candidate(s) need to receive further messages after the solicitation message, in an option, a message-type indication or ID (at least an indication whether the message is the solicitation message or not) of the message which is to be sent in a scheduled HARQ transmission may be indicated in SCI of the scheduled HARQ transmission. In another option, HARQ control information elements included in SCI such as new data indicator and/or redundancy version may be used to convey at least whether the message sent in the scheduled HARQ transmission is the solicitation message or not.

In another option, different L2 DST ID may be used when sending other than the solicitation message.

In some example embodiments, the criteria may comprise, among other, a first location range between a first minimum distance and a first maximum distance from the Tx UE, as set by the Tx UE for relay UE candidates.

In some example embodiments, the exceptional subset of the criteria may comprise, among other, a second location range between a second minimum distance and a second maximum distance from the Tx UE, as set by the Tx UE for relay UE candidates. The second location range may be within the first location range.

In some example embodiments, the criteria as well as the exception subset of the criteria may comprise, among others, different thresholds for received signal strength or channel quality upon reception of the solicitation message or HARQ transmission of the designated SL HARQ process from the Tx UE or Channel Busy Ration (CBR), as experienced by relay UE candidates.

In some example embodiment, the criteria as well as the exception subset of the criteria may comprise the radio condition between a relay UE candidate and one or multiple other group members and/or its serving/camping gNB, e.g. if the relay UE candidate has already obtained the corresponding radio condition measurement by receiving from the one or multiple other group members or monitoring the DL reference signals. This allows the Tx UE to consider and set the criterions for both SL and cellular-access link for optimizing the E2E performance.

FIG. 3 shows an apparatus according to an example embodiment of the invention. The apparatus may be a terminal such as a UE (in particular: a Tx UE), or an element thereof. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises means for indicating 100, means for transmitting 110, means for monitoring 120, and means for deciding 130. The means for indicating 100, means for transmitting 110, means for monitoring 120, means for deciding 130 may be an indicating means, transmitting means, monitoring means, and deciding means, respectively. The means for indicating 100, means for transmitting 110, means for monitoring 120, and means for deciding 130 may be an indicator, transmitter, monitor, and decider, respectively. The means for indicating 100, means for transmitting 110, means for monitoring 120, and means for deciding 130 may be an indicating processor, transmitting processor, monitoring processor, inferring processor, and deciding processor, respectively.

The means for indicating 100 indicates that a HARQ process is initiated (S100). The HARQ process is for transmitting at least a first HARQ message. The first HARQ message comprises an inquiry. It is the first message of the HARQ process. The inquiry inquires whether a relay terminal for relaying a communication of a transmitting terminal is available. It may be a discovery solicitation message.

The means for transmitting 110 transmits the first HARQ message using the HARQ process (S110).

The means for monitoring 120 monitors whether a HARQ feedback is received from at least one relay terminal in response to the first HARQ message according to the HARQ process (S120). That is, the means for monitoring 120 monitors whether the HARQ feedback is received at the resource allocated by the HARQ process to the HARQ feedback for the first HARQ message. The HARQ feedback may comprise ACK or NACK.

If the HARQ feedback is received from the at least one relay terminal (S120=yes), the means for deciding 130 decides that the at least one relay terminal is available (S130). If the HARQ feedback is not received from the at least one relay terminal (S120=no), the means for deciding 130 decides that the at least one relay terminal is not available (S140).

FIG. 5 shows an apparatus according to an example embodiment of the invention. The apparatus may be a terminal such as a UE (in particular: a Rx UE), or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for transmitting 230, first and second means for monitoring 200 and 210, and means for evaluating 220. The means for transmitting 230, first and second means for monitoring 200 and 210, and means for evaluating 220 may be a transmitting means, first and second monitoring means, and evaluating means, respectively. The means for transmitting 230, first and second means for monitoring 200 and 210, and means for evaluating 220 may be a transmitter, first and second monitor, and evaluator, respectively. The means for transmitting 230, first and second means for monitoring 200 and 210, and means for evaluating 220 may be a transmitting processor, first and second monitoring processor, inferring processor, and evaluating processor, respectively.

The first means for monitoring 200 monitors whether an indication of an initiation of a HARQ process is received from a transmitting terminal (S200). A first message of the HARQ process comprises an inquiry. The inquiry inquires if a relay terminal for relaying a communication is available. It may be a discovery solicitation message.

If the indication is received (S200=yes), the second means for monitoring 210 monitors whether the first HARQ message of the HARQ process is received (S210).

If the first HARQ message is received (S210=yes), the means for evaluating 220 evaluates, based on the inquiry, whether a relay terminal is available to relay the communication for the transmitting terminal (S220);

If the relay terminal is available to relay the communication for the transmitting terminal (S220=yes), the means for transmitting 230 transmits a HARQ feedback in response to the received first HARQ message according to the HARQ process (S230). That is, the means for transmitting 230 transmits the HARQ feedback at the resource allocated by the HARQ process to the HARQ feedback for the first HARQ message. The HARQ feedback may comprise ACK or NACK.

FIG. 7 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 4 and 6 and related description.

Some example embodiments are explained with respect to a 5G network. However, the invention is not limited to 5G. It may be used in networks of other 3GPP generations, too, e.g. in previous generations such as 3G and 4G, and in forthcoming generations such as 6G, 7G, etc.

Some example embodiments are explained with respect to a groupcast communication. However, the invention is not limited to a groupcast communication. Some example embodiments may be applied to a unicast communication and/or to a broadcast communication instead of or in addition to a groupcast communication. Note that the HARQ procedure is defined by 3GPP for unicast and groupcast and may be defined for broadcast, too.

Some example embodiments of the invention may be applied for a generic request-response procedure from a Tx UE to other UE members of a groupcast.

Some example embodiments are applicable to blind relay where the TX UE does not know the identity of the relay UE.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal, such as a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

What is claimed is:

1. An apparatus comprising:
one or more processors; and
a memory storing instructions that, when executed by the one or more processors, cause the one or more processors to:
indicate that a hybrid automatic repeat request process is initiated for transmitting at least a first hybrid automatic repeat request message comprising an inquiry as the first message of the hybrid automatic repeat request process, wherein the inquiry requests an availability indication of a relay terminal for relaying a communication of a transmitting terminal, wherein the communication is one of a unicast communication and a groupcast communication, and wherein the transmitting terminal and the relay terminal are members of the unicast and groupcast, respectively;
transmit the first hybrid automatic repeat request message using the hybrid automatic repeat request process, wherein the first hybrid automatic repeat request message comprises an exception criterion for being available as the relay terminal for the relaying of the communication, wherein the first hybrid automatic repeat request message is transmitted on a first resource, and wherein the first resource is excluded for any other hybrid automatic repeat request process comprising a hybrid automatic repeat request message not comprising the inquiry as the first message, and wherein the indicating indicates that the first message is transmitted on the first resource;
determine that a hybrid automatic repeat request feedback is received from at least one relay terminal in response to the first hybrid automatic repeat request message according to the hybrid automatic repeat request process, wherein the determining is performed on a second resource different from the first resource; and the second resource is related to the first resource according to the hybrid automatic repeat request process;
decide that the at least one relay terminal is available based on the hybrid automatic repeat request feedback being received from the at least one relay terminal; and
based on the at least one relay terminal being available, transmit a second hybrid automatic repeat request message using the hybrid automatic repeat request process, wherein the second hybrid automatic repeat request message does not comprise the inquiry.

2. The apparatus according to claim 1, wherein the indicating comprises sending a sidelink control information indicating the hybrid automatic repeat request process and the communication is a sidelink communication.

3. The apparatus according to claim 2, wherein the instructions, when executed by the one or more processors, further cause the one or more processors to: inhibit using the at least one relay terminal for the relaying of the communication depending on a content of the hybrid automatic repeat request feedback.

4. The apparatus according to claim 3, wherein the first hybrid automatic repeat request message further comprises configuration data for the relaying.

5. The apparatus according to claim 4, wherein the inquiry is a discovery solicitation message.

6. The apparatus according to claim 5, wherein the hybrid automatic repeat request feedback is one of an acknowledgment and a non-acknowledgment of the hybrid automatic repeat request process.

7. The apparatus according to claim 6, wherein the transmitting terminal comprises the apparatus.

8. A system comprising:
an apparatus;
one or more processors; and
a memory storing instructions that, when executed by the one or more processors, cause the one or more processors to:
indicate that a hybrid automatic repeat request process is initiated for transmitting at least a first hybrid automatic repeat request message comprising an inquiry as the first message of the hybrid automatic repeat request process, wherein the inquiry requests an availability indication of a relay terminal for relaying a communication of a transmitting terminal, wherein the communication is one of the unicast communication and the groupcast communication, and wherein the transmitting terminal and the relay terminal are members of the unicast and groupcast, respectively;
transmit the first hybrid automatic repeat request message using the hybrid automatic repeat request process, wherein the first hybrid automatic repeat request message comprises an exception criterion for being available as the relay terminal for the relaying of the communication, wherein the first hybrid automatic repeat request message is transmitted on a first resource, and wherein the first resource is excluded for any other hybrid automatic repeat request process comprising a hybrid automatic repeat request message not comprising the inquiry as the first message, and wherein the indicating indicates that the first message is transmitted on the first resource;
determine that a hybrid automatic repeat request feedback is received from at least one relay terminal in response to the first hybrid automatic repeat request message according to the hybrid automatic repeat request process, wherein the determining is performed on a second resource different from the first resource; and the second resource is related to the first resource according to the hybrid automatic repeat request process;
decide that the at least one relay terminal is available based on the hybrid automatic repeat request feedback being received from the at least one relay terminal; and
based on the at least one relay terminal being available, transmit a second hybrid automatic repeat request message using the hybrid automatic repeat request process, wherein the second hybrid automatic repeat request message does not comprise the inquiry.

9. The apparatus according to claim 8, wherein the indicating comprises sending a sidelink control information indicating the hybrid automatic repeat request process and the communication is a sidelink communication.

10. The apparatus according to claim 9, wherein the instructions, when executed by the one or more processors, further cause the one or more processors to: inhibit using the at least one relay terminal for the relaying of the communication depending on a content of the hybrid automatic repeat request feedback.

11. The apparatus according to claim 10, wherein the first hybrid automatic repeat request message further comprises configuration data for the relaying.

12. The apparatus according to claim 11, wherein the inquiry is a discovery solicitation message.

13. The apparatus according to claim 12, wherein the hybrid automatic repeat request feedback is one of an acknowledgment and a non-acknowledgment of the hybrid automatic repeat request process.

14. The apparatus according to claim 13, wherein the transmitting terminal comprises the apparatus.

15. A method performed by an apparatus, the method comprising:

indicating, by the apparatus, that a hybrid automatic repeat request process is initiated for transmitting at least a first hybrid automatic repeat request message comprising an inquiry as the first message of the hybrid automatic repeat request process, wherein the inquiry requests an availability indication of a relay terminal for relaying a communication of a transmitting terminal, wherein the communication is one of the unicast communication and the groupcast communication, and wherein the transmitting terminal and the relay terminal are members of the unicast and groupcast, respectively;

transmitting, by the apparatus, the first hybrid automatic repeat request message using the hybrid automatic repeat request process, wherein the first hybrid automatic repeat request message comprises an exception criterion for being available as the relay terminal for the relaying of the communication, wherein the first hybrid automatic repeat request message is transmitted on a first resource, and wherein the first resource is excluded for any other hybrid automatic repeat request process comprising a hybrid automatic repeat request message not comprising the inquiry as the first message, and wherein the indicating indicates that the first message is transmitted on the first resource;

determining, by the apparatus, that a hybrid automatic repeat request feedback is received from at least one relay terminal in response to the first hybrid automatic repeat request message according to the hybrid automatic repeat request process, wherein the determining is performed on a second resource different from the first resource; and the second resource is related to the first resource according to the hybrid automatic repeat request process;

deciding, by the apparatus, that the at least one relay terminal is available based on the hybrid automatic repeat request feedback being received from the at least one relay terminal; and based on the at least one relay terminal being available, transmitting, by the apparatus, a second hybrid automatic repeat request message using the hybrid automatic repeat request process, wherein the second hybrid automatic repeat request message does not comprise the inquiry.

16. The method according to claim 15, wherein the indicating comprises sending a sidelink control information indicating the hybrid automatic repeat request process and the communication is a sidelink communication.

17. The method according to claim 16, further comprising inhibiting using the at least one relay terminal for the relaying of the communication depending on a content of the hybrid automatic repeat request feedback.

18. The method according to claim 17, wherein the first hybrid automatic repeat request message further comprises configuration data for the relaying.

19. The method according to claim 18, wherein the inquiry is a discovery solicitation message.

20. The method according to claim 19, wherein the hybrid automatic repeat request feedback is one of an acknowledgment and a non-acknowledgment of the hybrid automatic repeat request process.

* * * * *